United States Patent
Park et al.

(10) Patent No.: US 9,298,892 B2
(45) Date of Patent: Mar. 29, 2016

(54) TERMINAL APPARATUS AND METHOD FOR PLAYING MULTIMEDIA CONTENT ENCRYPTED BASED ON DRM

(71) Applicants: Intellectual Discovery Co., Ltd., Seoul (KR); Inka Entworks, Inc., Seoul (KR)

(72) Inventors: Jin Yong Park, Seoul (KR); Junho Hong, Seoul (KR)

(73) Assignees: Intellectual Discovery Co., Ltd., Seoul (KR); Inka Entworks, Inc., Seoul (KR)

( * ) Notice: Subject to any disclaimer, the term of this patent is extended or adjusted under 35 U.S.C. 154(b) by 30 days.

(21) Appl. No.: 14/265,563

(22) Filed: Apr. 30, 2014

(65) Prior Publication Data

US 2014/0325686 A1 Oct. 30, 2014

(30) Foreign Application Priority Data

Apr. 30, 2013 (KR) ........................ 10-2013-0048280

(51) Int. Cl.
*G06F 21/10* (2013.01)
(52) U.S. Cl.
CPC .............. *G06F 21/10* (2013.01); *G06F 21/105* (2013.01)
(58) Field of Classification Search
None
See application file for complete search history.

(56) References Cited

U.S. PATENT DOCUMENTS

| | | | |
|---|---|---|---|
| 2003/0229900 A1* | 12/2003 | Reisman | G06F 17/30873 725/87 |
| 2007/0055743 A1* | 3/2007 | Pirtle et al. | 709/217 |
| 2008/0249872 A1* | 10/2008 | Russell et al. | 705/14 |
| 2013/0152221 A1* | 6/2013 | Yin et al. | 726/31 |
| 2015/0178478 A1* | 6/2015 | Kocher | G06F 21/10 726/26 |

* cited by examiner

*Primary Examiner* — Michael R Vaughan

(57) ABSTRACT

A method for playing multimedia content encrypted based on digital rights management (DRM) by a terminal apparatus having a web server module unit, the method comprising: receiving a request for playing the multimedia content encrypted based on DRM; converting a local file path via which the multimedia content encrypted based on DRM corresponding to the received play request is stored into a web server URL path for the web server module unit; providing the web server URL path to a multimedia device player for playing the multimedia content encrypted based on DRM; when the multimedia device player accesses the web server module unit by using the web server URL path, checking whether there is a session being connected to the web server URL; and controlling whether to decode the multimedia content encrypted based on DRM depending on the checking results.

4 Claims, 3 Drawing Sheets

TERMINAL APPARATUS AND METHOD FOR PLAYING MULTIMEDIA CONTENT ENCRYPTED BASED ON DRM

RELATED APPLICATIONS

This application claims the benefit of Korean Patent Application No. 10-2013-0048280, filed on Apr. 30, 2013, which is hereby incorporated by reference as if fully set forth herein.

FIELD OF THE INVENTION

The present invention relates to a terminal apparatus and method for playing multimedia content encrypted based on digital rights management (DRM), and more particularly, to a terminal apparatus and method capable of solving a security problem in playing multimedia content encrypted based on DRM.

BACKGROUND OF THE INVENTION

In line with the advancement and popularization of computer technologies, content (books, comics, records, movies, broadcastings, newspapers, or the like) of general commercial transaction produced, kept, and managed in an analog form has been mostly digitalized.

The characteristics and advantages of digital content that quality of the original digital content is free of damage although digital content is infinitely used, digital content is easy to copy and modify, and easy to transfer and distribute within a short time using a ultra high-speed communication network although it is a large amount of work, make analog works digitalized at high speed.

However, the advantages of digital content also act as a factor violating the rights and benefits of the original author. Specifically, since a copy is identical to the original, the intent to purchase the original may be dampened and since the original is simply modified and duplicated without the consent of the author, works may be easily plagiarized. In addition, the ease in transfer and distribution makes unauthorized duplicates instantly spread through the Internet, incapacitating even legal controls.

Such negative factors may demoralize authors to weaken their intent for creating works, and thus cause hesitation of digitalization. Therefore, a technical protecting device capable of effectively managing copyright, while sufficiently saving the digital advantages of digital content, is required.

In order to protect the benefits and rights of digital content, a technique of applying DRM to digital content has emerged, and various DRM schemes have also been used.

Here, the term DRM refers to a series of techniques of preventing illegal reproduction or duplication, protecting the rights and benefits of respective subjects (content creator, a distribution dealer, a distributor, a user, a copyright holder, and the like) participating in a life cycle (i.e., creation, processing, distribution, and consumption of content) of digital content, and supporting charging and payment according to the use of digital content.

Thus, a server that provides digital content using a DRM scheme encrypts digital content and transmits the same, and a license management server transmits a license to an authorized user so that only the authorized user can play and output the digital content. Here, the license includes a digital content encryption key used for decoding the digital content, digital content permission information as information regarding the use of the digital content, and the like.

Meanwhile, recently, terminal apparatuses equipped with an operating system have become prevalent, and typical terminal apparatuses include iPhone equipped with an iOS operating system provided by Apple Inc. and Android phone equipped with an android operating system provided by Google Inc., and the like.

In supporting multimedia content encrypted based on DRM, a decoding module scheme used in a general personal computer (PC) environment may not be applied to the terminal apparatuses equipped with such operating systems. Thus, a dedicated DRM decoding module is directly installed in operating systems of the terminal apparatuses equipped with such operating systems. A typical example is FairPlay of Apple Inc.

However, in case of the dedicated DRM decoding module directly installed in the operating systems, it was difficult to alter a source code of an installed multimedia device player or add a function in terms of characteristics of the operating systems.

Thus, conventionally, a scheme of providing a local web server module to a terminal apparatus equipped with an operating system and allowing the terminal apparatus equipped with the operating system, without a dedicated DRM decoding module, to play multimedia content encrypted based on DRM has been proposed.

In this case, however, if any other application accesses a URL in which multimedia content encrypted based on DRM can be played, there was a security problem that the original of the multimedia content encrypted based on DRM may be leaked.

SUMMARY OF THE INVENTION

In view of the above, therefore, the present invention provides a terminal apparatus and method for playing multimedia content encrypted based on digital rights management (DRM) capable of maintaining a URL only in a single session in a local web server module within the terminal apparatus, while maintaining an HTTP communication protocol, in playing multimedia content through HTTP streaming by using the HTTP communication protocol.

In accordance with the present invention, there is provided a method for playing multimedia content encrypted based on digital rights management (DRM) by a terminal apparatus having a web server module unit, which includes: receiving a request for playing the multimedia content encrypted based on DRM; converting a local file path via which the multimedia content encrypted based on DRM corresponding to the received play request is stored into a web server URL path for the web server module unit; providing the web server URL path to a multimedia device player for playing the multimedia content encrypted based on DRM; when the multimedia device player accesses the web server module unit by using the web server URL path, checking whether there is a session being connected to the web server URL; and controlling whether to decode the multimedia content encrypted based on DRM depending on the checking results.

In the embodiment, said controlling whether to decode includes: if there is no session being connected to the web server URL, decoding the multimedia content encrypted based on DRM, and if there is a session being connected to the web server URL, performing no decoding on the multimedia content encrypted based on DRM.

In the embodiment, the method further comprising: if there is no session being connected to the web server URL, storing session information between the multimedia device player and the web server module unit.

In the embodiment, the method further comprising: when performing the decoding, decoding the multimedia content encrypted based on DRM by using a license for the multimedia content encrypted based on DRM; and providing the decoded multimedia content to the multimedia device player.

In accordance with the present invention, there is provided a terminal apparatus for playing multimedia content encrypted based on digital rights management (DRM), comprising: a web server module unit; a resource manager unit configured to convert, upon receipt of a request for playing the multimedia content encrypted based on DRM, a local file path via which the multimedia content encrypted based on DRM corresponding to the received play request is stored into a web server URL path for the web server module unit; and a multimedia device player unit configured to access the web server module unit by using the web server URL path for playing the multimedia content encrypted based on DRM, wherein when the multimedia device player accesses the web server module unit by using the web server URL path, the web server module unit is configured to check whether there is a session being connected to the web server URL.

In the embodiment, the terminal apparatus of claim 5, further comprising: a decoding module unit configured to decode the multimedia content encrypted based on DRM if there is no session being connected to the web server URL, and not to decode the multimedia content encrypted based on DRM if there is a session being connected to the web server URL.

In the embodiment, if there is no session being connected to the web server URL, the web server module unit is configured to store session information between the multimedia device player and the web server module unit.

In the embodiment, when performing the decoding, the decoding module unit is configured to decode the multimedia content encrypted based on DRM by using a license for the multimedia content encrypted based on DRM, and provide the decoded multimedia content to the multimedia device player.

BRIEF DESCRIPTION OF THE DRAWINGS

The above and other objects and features of the present invention will become apparent from the following description of embodiments, given in conjunction with the accompanying drawings, in which.

DETAILED DESCRIPTION OF THE EMBODIMENT

Hereinafter, various embodiments of the present invention will be described in detail with the accompanying drawings.

Figure 1:
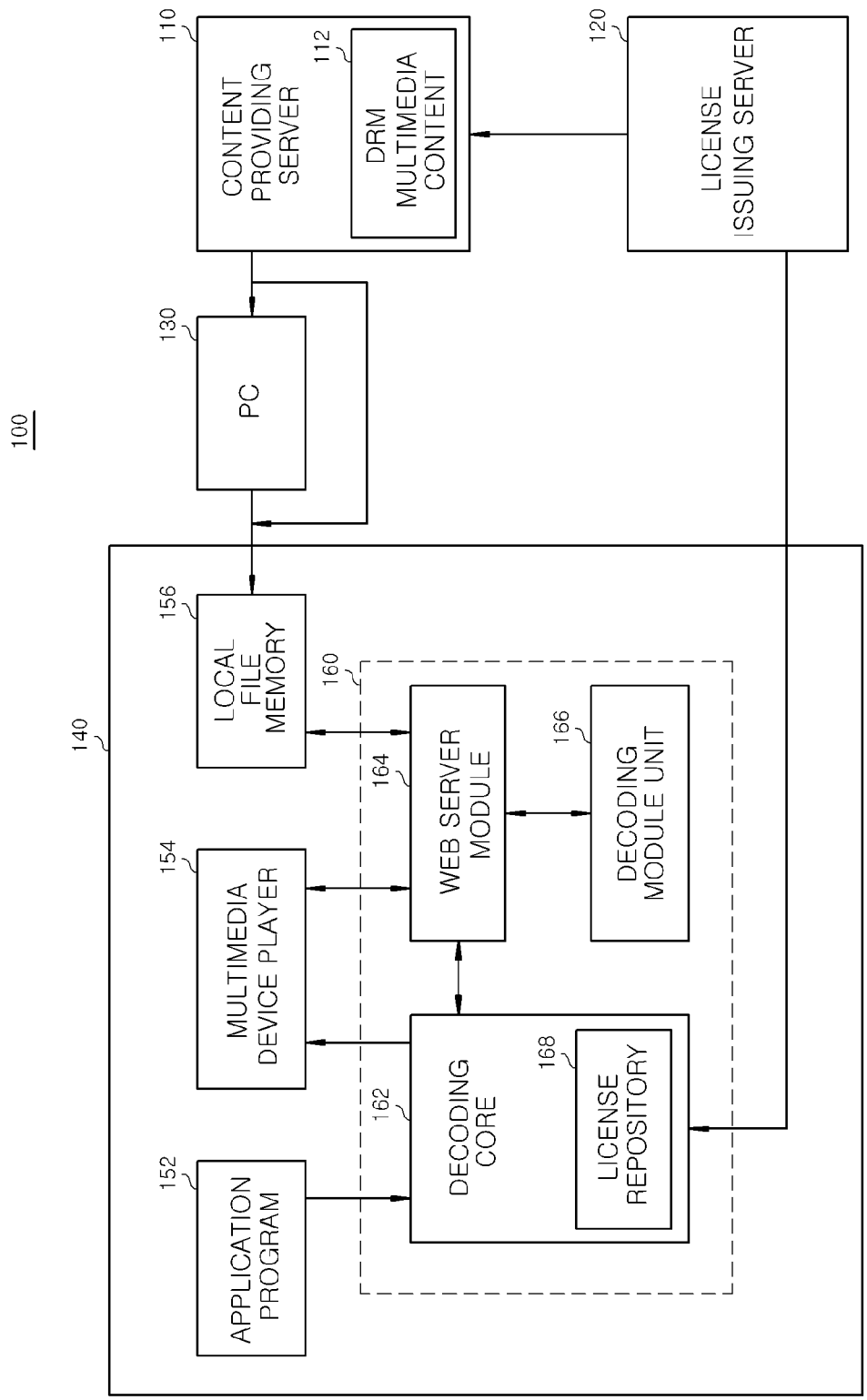
FIG. 1 is a block diagram illustrating a DRM system linked with a terminal apparatus in accordance with an embodiment of the present invention.

FIG. 1 is a block diagram illustrating a digital rights management (DRM) system linked with a terminal apparatus in accordance with an embodiment of the present invention. Referring to FIG. 1, a DRM system 100 linked with a terminal apparatus includes a content providing server 110, a license issuing server 120, a personal computer (PC) 130, and an operating system (OS)-equipped terminal apparatus 140.

The content providing server 110 may have multimedia content to be provided to users, which has been encrypted by using an encryption key provided from the license issuing server 120, stored as multimedia content 112 encrypted based on DRM therein.

The license issuing server 120 may be a server for generating and issuing a license for the multimedia content 112 encrypted based on DRM stored in the content providing server 110.

The PC 130 may be connected to the content providing server 110 through the Internet, or the like, and a user may log in to connect the PC 130 to the content providing server 110, download the multimedia content encrypted based on DRM, and store the same.

The OS-equipped terminal apparatus 140 may include a native unit 150 for performing a general function of a terminal apparatus and a DRM decoding unit 160 for decoding multimedia content encrypted based on DRM. Here, the terminal apparatus 140 may be implemented as a smartphone equipped with the operating system (iOS) provided by Apple Inc., or the android operating system provided by Google Inc.

The native unit 150 may include a plurality of application programs 152, a multimedia device player 154, and a local file memory 156. When a user drives an application program 152 related to downloading of multimedia content encrypted based on DRM, the native unit 150 may download multimedia content encrypted based on DRM stored in the PC 130 through a universal series bus (USB), or the like, and store the same in the local file memory 156, or download the multimedia content 112 encrypted based on DRM stored in the content providing server 110 through Wi-Fi, or the like, and store the same in the local file memory 156. Further, the multimedia device player 154 includes MPMoviePlayer, AVPlayer (iOS4+), AudioQueue, or the like.

The DRM decoding unit 160 may include a decoding core 162, a web server module unit 164, and a decoding module unit 166.

When the application program 152 requests playing of multimedia content encrypted based on DRM stored in the local file memory 156, the decoding core 162 may ask the license repository 168 about whether the multimedia content encrypted based on DRM requested to be played has been licensed. When the multimedia content encrypted based on DRM requested to be played has not been licensed, the decoding core 162 may be connected to the license issuing server 120 through the native unit 150. In this case, a security channel may be established using a diffie-helman-type key distribution algorithm between the OS-equipped terminal apparatus 140 and the license issuing server 120. In addition, the OS-equipped terminal apparatus 140 may receive a license from the license issuing server 120 through the established security channel and store the same in the license repository 168. Meanwhile, when the multimedia content encrypted based on DRM requested to be played has been licensed, the decoding core 162 may convert a physical local file path of the multimedia content encrypted based on DRM stored in the local file memory 156 into a virtual uniform resource locator (URL) path for a web server (hereinafter, referred to as a "web server URL") and provide the same to the multimedia device player 154.

When the multimedia device player 154 receives the web server URL path and accesses the web server module unit 164, the web server module unit 164 may check whether there is a session currently connected to the web server URL.

If there is no session connected to the web server URL, the web server module unit 164 may store session information between itself and the multimedia device player 154. Here, the session information may include information regarding a connection state between the web server module unit 164 and the multimedia device player 154, and may be stored until a connection between the web server module unit 164 and the multimedia device player 154 is completed.

In addition, the web server module unit 164 may reversely convert the web server URL path into a physical local file path of the multimedia content encrypted based on DRM stored in the local file memory 156, read the multimedia content encrypted based on DRM stored in the local file memory 156 by using the physical local file path, decode the read multimedia content encrypted based on DRM by using the decoding module 166, and then provide the same to the media device player 154.

The decoding module unit 166 may decode the multimedia content encrypted based on DRM provided from the web server module unit 164. The decoding module unit 166 may retrieve a predetermined encryption key CEK from the license repository 168 of the decoding core 162 to decode DRM multimedia content data.

Meanwhile, in a state in which the multimedia device player 154 is connected to the web server module unit 164, a hacker program may hack the web server URL accessed by the multimedia device player 154 to secure the multimedia content, which has been decoded from the multimedia content encrypted based on DRM, being played by the multimedia device player 154. In this case, the hacker program may access the web server module unit 164 by using a hacked web server URL.

In this case, since there is a session being connected to the web server URL, the web server module unit 164 may reversely convert the web server URL path into a physical local file path of the multimedia content encrypted based on DRM stored in the local file memory 156, read the multimedia content encrypted based on DRM as stored in the local file memory 156 by using the physical local file path, and provide the read multimedia content encrypted based on DRM to the hacking program.

Figure 2:
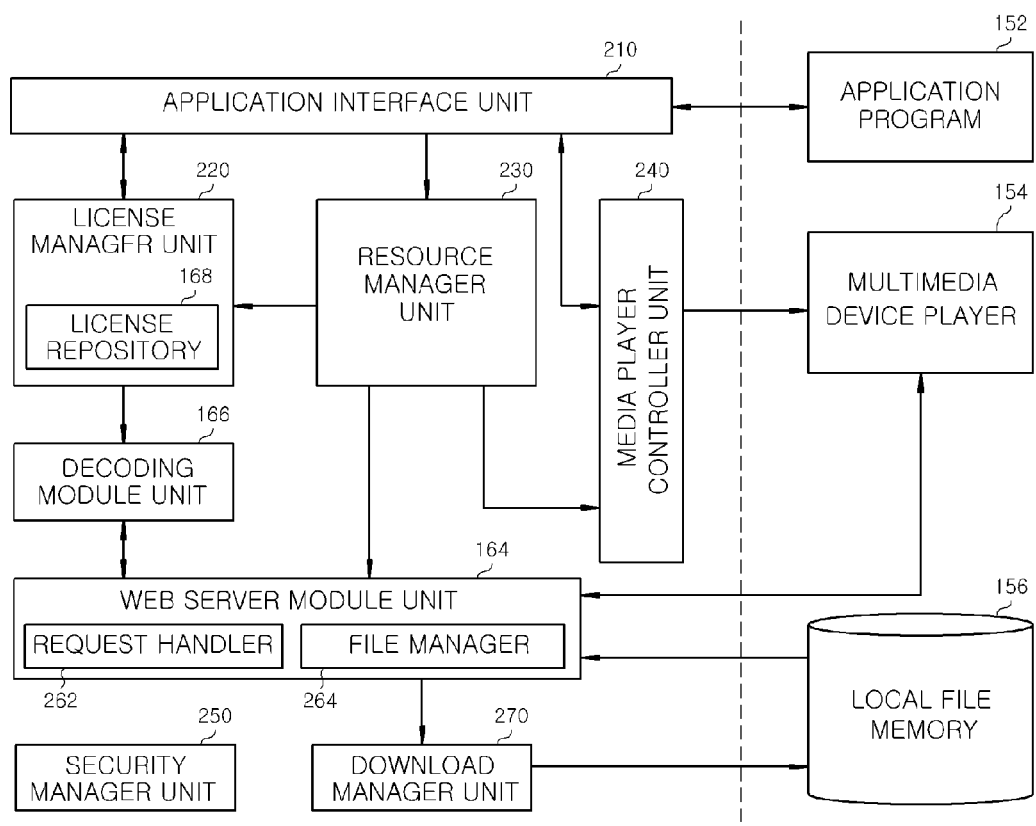
FIG. 2 is a block diagram specifically illustrating the DRM decoding unit illustrated in FIG. 1.

FIG. 2 is a block diagram specifically illustrating the DRM decoding unit illustrated in FIG. 1. Referring to FIG. 2, the DRM decoding unit 160 includes an application interface unit 210, a license manager unit 220, a resource manager unit 230, a media player controller unit 240, a decoding module unit 166, a web server module unit 164, a security manager unit 250, and a download manager unit 270.

The application interface unit 210 is an interface for processing such as requesting playing of the multimedia content encrypted based on DRM stored in the local file memory 156 by the application program 152. When the application program 152 requests playing of the multimedia content encrypted based on DRM stored in the local file memory 156, the application interface unit 210 serves to provide interface functions for calling and controlling various functions regarding playing of the multimedia device player 154, and also deliver various events related to playing of the multimedia device player 154 to the application program 152.

The license manager unit 220 includes the license repository 168 and is connected to the license issuing server 120 through the application interface unit 210. When the license manager unit 220 is connected to the license issuing server 120, the license manager unit 220 serves to issue and update a license related to multimedia content encrypted based on DRM. When playing of multimedia content encrypted based on DRM is requested through the application interface unit 210, the license manager unit 220 checks whether the multimedia content encrypted based on DRM has been licensed, and if a license period thereof has been lapsed or when the multimedia content encrypted based on DRM has been played by an allowed number of times of license, the license manager unit 220 prohibits the license for the multimedia content encrypted based on DRM.

The resource manager unit 230 converts a physical local file path of the multimedia content encrypted based on DRM stored in the local file memory 156 into a web server URL path and manages it. When playing of the multimedia content encrypted based on DRM stored in the local file memory 156 is requested by the application program 152 through the application interface unit 210, the resource manager unit 230 converts a physical file path of the multimedia content encrypted based on DRM requested to be played into a web server URL path and provides the same to the media player controller unit 240.

Further, the resource manager unit 230 provides the local file path of the multimedia content encrypted based on DRM requested to be played to the license manager unit 220, and requests checking and issuing of a license of the multimedia content encrypted based on DRM requested to be played. Also, when a license of the multimedia content encrypted based on DRM requested to be played is checked, the resource manager unit 230 provides the web server URL path to the media player controller unit 240.

The media player controller unit 240 generates an object of the basic multimedia device player 154 installed in the OS-equipped terminal apparatus 140 and handles playing and controlling of multimedia. The media player controller unit 240 performs a command related to the multimedia device player 154 of the application program 152 delivered to the application interface unit 210 and delivers an event generated by the multimedia device player 154 to the application interface unit 210. Also, when a command for temporary stop, position search, multiplication adjustment, and playing stop is input from the application program 152 through the application interface unit 210, the media player controller unit 240 controls the multimedia device player 152 depending on the command.

The decoding module unit 166 decodes the multimedia content encrypted based on DRM requested to be played, read from the local file memory 156. The decoding module unit 166 requests checking of a license to the license manager unit 220, fetches a predetermined encryption key CEK information required for decoding from the license manager unit 220, and decodes the multimedia content encrypted based on DRM requested to be played.

In response to a hyper text transfer protocol (HTTP) range request from the resource manager unit 230, the web server module unit 164 serves to return corresponding data of the multimedia content encrypted based on DRM as requested.

Specifically, when the multimedia device player 154 receives a web server URL and accesses the web server module unit 164, the web server module unit 164 may check whether there is a session being connected to the web server URL.

If there is no session being connected to the web server URL, the web server module unit 164 may store session information between itself and the multimedia device player 154. Here, the session information may include information regarding a connection state between the web server module unit 164 and the multimedia device player 154 and may be stored until the connection between the web server module unit 164 and the multimedia device player 154 is completed. And, the web server module unit 164 may be provided with a local file path of the multimedia content encrypted based on DRM desired to be played, corresponding to the web server URL path from the resource manager unit 230. Also, the web server module unit 164 may read the multimedia content encrypted based on DRM desired to be played, stored in the local file memory 156, by using the local file path of the multimedia content encrypted based on DRM desired to be played. The web server module unit 164 provides the multimedia content encrypted based on DRM read from the local file memory 156 to the decoding module unit 166, and the decoding module unit 166 may output decoded multimedia content to the multimedia device player 154.

Meanwhile, in a state in which the multimedia device player 154 is being connected to the web server module unit 164, the hacker program may hack the web server URL accessed by the multimedia device player 154 to secure the multimedia content, which has been decoded from the multimedia content encrypted based on DRM, being played by the multimedia device player 154. In this case, the hacker program may access the web server module unit 164 by using the hacked web server URL.

In this case, since there is a session being connected to the web server URL, the web server module unit 164 may reversely convert the web server URL path into a physical local file path of the multimedia content encrypted based on DRM stored in the local file memory 156, read the multimedia content encrypted based on DRM as stored in the local file memory 156 by using the physical local file path, and provide the read multimedia content encrypted based on DRM to the hacking program.

Here, the web server module unit 164 may include a request handler 262 and a file manager 264. The request handler 262 handles processing of a request of an HTTP request, checks validity of a web server URL path including a globally unique identifier (GUID) based on a onetime password (OTP) concept changed whenever the multimedia content encrypted based on DRM is played, and provides HTTP response information and decoded multimedia content as a response. When the request of the HTTP request includes a request of DRM multimedia content data of a particular resource, the file manager 264 converts the web server URL path into a corresponding local file path through the resource manager unit 230, reads the multimedia content encrypted based on DRM, decodes the read multimedia content encrypted based on DRM through the decoding module unit 166, and then returns the decoded multimedia content.

The security manager unit 250 checks whether the terminal apparatus is abnormally driven, i.e., checks whether jailbreak of releasing or hacking an iPhone locking device of Apple Inc., or routing of hacking the operating system of Android Inc. to obtain authority of a manager has occurred, and in case of an abnormal situation, the security manager unit 250 may control the decoding module unit 166 not to perform a decoding operation. Also, in this case, when a security rule allows decoding, the security manager unit 250 may control the decoding module unit to decode the read DRM media content data.

In addition, when packet snipping to wiretap network traffic in a loopback environment is sensed, the decoded multimedia content data delivered to the multimedia device player 154 through the web server module unit 164 may be exposed, and thus the security manager unit 250 controls the decoding module unit 166 not to perform a decoding operation.

In case of a remote play mode, the download manager unit 270 downloads multimedia content encrypted based on DRM of an external server, for example, the content providing server 110, and manages the same. That is, when multimedia content encrypted based on DRM present in an external server, rather than the multimedia content encrypted based on DRM stored in the local file memory 156, is desired to be played, the download manager unit 270 serves to store the corresponding multimedia content encrypted based on DRM in the local file memory 156. In case of a remote file data play mode (progressive download or download & play), the file manager 264 of the web server module unit 164 checks from the download manager unit 270 whether the corresponding DRM multimedia content data has been completely downloaded, before reading the requested multimedia content encrypted based on DRM, and if the corresponding DRM multimedia content data has not been completely downloaded, the file manager 264 waits.

Figure 3:
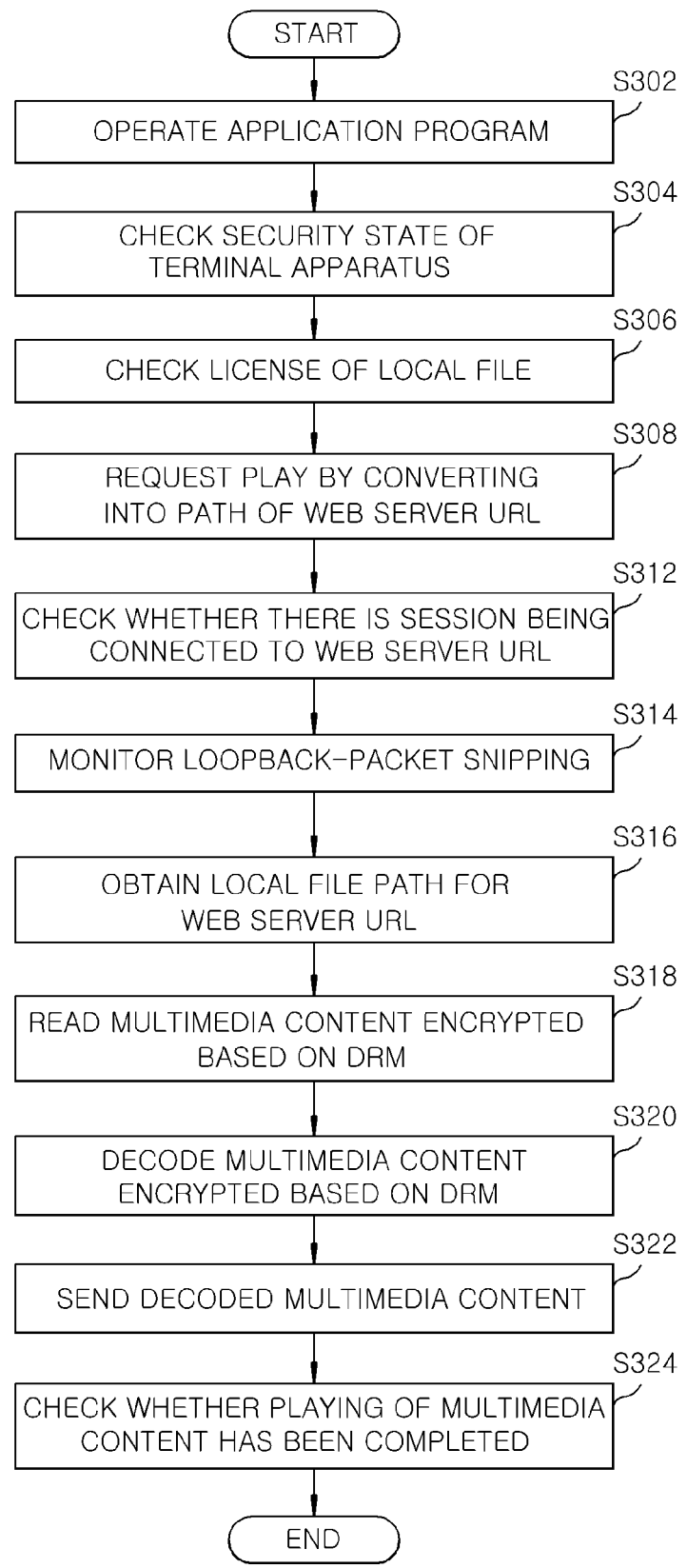
FIG. 3 is a flow chart illustrating a method of playing multimedia content encrypted based on DRM in accordance with an embodiment of the present invention.

FIG. 3 is a flow chart illustrating a method of playing multimedia content encrypted based on DRM in accordance with an embodiment of the present invention. Referring to FIG. 3, first, a user may operate the application program 152 related to playing of content stored in the terminal apparatus in step S302. Then, when the user selects multimedia content encrypted based on DRM desired to be played, for example, Documents/video.mp4, among files displayed in the application program 152, and clicks play, the application program 152 may provide a play-related function and a local file path of the multimedia content encrypted based on DRM to the application interface unit 210 of the decoding unit 160.

When the play-related function is input, the application interface unit 210 may call the security manager unit 250 to check a security state of the OS-equipped terminal apparatus 140 in step S304. The security manager unit 250 checks whether the terminal apparatus is abnormally driven, i.e., checks whether jailbreak of releasing or hacking an iPhone locking device of Apple Inc., or routing of hacking the operating system of Android Inc. to obtain authority of a manager has occurred in step S306, and in case of an abnormal situation, the security manager unit 250 may control the decoding module unit 166 not to perform a decoding operation. Meanwhile, it is determined whether the OS-equipped terminal apparatus 140 is normally driven according to the call of the security manager unit 250, the local file path of the multimedia content encrypted based on DRM desired to be played, which has been input to the application interface unit 210, may be provided to the resource manager unit 230.

The resource manager unit 230 may provide the input local file path, for example, Documents/video.mp4, to the license manager unit 220, and request checking and issuing of a license for the multimedia content encrypted based on DRM desired to be played in step S306.

In addition, when a license of the multimedia content encrypted based on DRM requested to be played is checked, the resource manager unit 230 may convert the local file path of the multimedia content encrypted based on DRM desired to be played into a web server URL path and request the media player controller unit 240 to play the web server URL, for example, http://localhost/xxxx_video.mp4 in step S308. Here, the term conversion has a concept including every configuration allowing for the use of a web server URL including matching. The media player controller unit 240 may generate an object of the basic multimedia device player 154 installed in the OS-equipped terminal apparatus 140 and provide the same to the multimedia device player 154.

In this case, the multimedia device player 154 may request the multimedia content encrypted based on DRM desired to be played.

When the multimedia content encrypted based on DRM desired to be played is requested by the multimedia device player 154, the web server module unit 164 may check whether there is a session being connected to the web server URL in step S312.

If there is a session being connected to the web server URL ("Y" in step S312), decoded multimedia content delivered to the multimedia device player 154 through the web server module unit 164 may be exposed, and thus, the decoding module unit 166 may not perform a decoding operation.

Meanwhile, if there is no session connected to the web server URL ("N" in step S312), the web server module unit 164 may store session information between itself and the multimedia device player 154.

In addition, when the multimedia content encrypted based on DRM desired to be played is requested by the multimedia device player 154, the web server module unit 164 may call the security manager unit 250 to check a security state. When packet snipping of tapping network traffic in a loopback environment is sensed in step S314, the decoded multimedia content delivered to the multimedia device player 154 through the web server module unit 164 may be exposed, and thus, the security manager unit 250 may also control the decoding module unit 166 not to perform a decoding operation.

Meanwhile, if the terminal apparatus is normally driven, the web server module unit 164 may obtain a local file path for the web server URL from the resource manager unit 230 in step S316.

When the local file path is provided from the resource manager unit 230, the file manager 264 of the web server module unit 164 may read the multimedia content encrypted based on DRM stored in the local file memory 156 by using the local file path in step S318.

The web server module unit 164 may provide the read multimedia content encrypted based on DRM to the decoding module unit 166. The decoding module unit 166 may request the license manager unit 220 to check a license, fetch predetermined encryption key (CEK) information required for decoding from the license manager unit 220, and decode the multimedia content encrypted based on DRM requested to be played in step S320.

The request handler 262 of the web server module unit 164 may transmit the multimedia content decoded through the decoding module unit 166 to the multimedia device player 154 in step S322.

The multimedia device player 154 may play the decoded multimedia content received from the web server module unit 164, and check whether playing of the multimedia content has been completed in step S324. When playing of the multimedia content has been completed, the multimedia device player 154 may play or terminate different multimedia content, or otherwise, the multimedia device player 154 continuously requests data of the same multimedia content.

In accordance with various embodiments of the present invention as described above, since the web server URL for HTTP streaming playing of the multimedia device player is maintained in a single session, leakage of the original content of multimedia content encrypted based on DRM to a hacking program can be prevented.

Meanwhile, the method in accordance with various embodiments of the present invention as described above may be implemented with program codes and stored in various non-transitory computer readable medium so that it can be provided to each server or equipment.

The term non-transitory readable medium as used herein refers to a medium that can semi-permanently store data and be read by a device, rather than a medium that stores temporarily data, such as a register, a cache, a memory, or the like. Specifically, various applications or programs as described above may be stored in a non-transitory readable medium, such as a CD, a DVD, a hard disk, a Blueray disk, a USB, a memory card, a ROM, or the like, and provided.

While the invention has been shown and described with respect to the embodiments, the present invention is not limited thereto. It will be understood by those skilled in the art that various changes and modifications may be made without departing from the scope of the invention as defined in the following claims.

What is claimed is:

1. A method for playing multimedia content encrypted based on digital rights management (DRM), the method performed by a terminal apparatus comprising a multimedia device player unit and a DRM decoding unit, the DRM decoding unit comprising a web server module unit, the method comprising:
   receiving, by the terminal apparatus, a request for playing the multimedia content encrypted based on DRM;
   converting, by the terminal apparatus, a local file path via which the multimedia content encrypted based on DRM corresponding to the received play request is stored into a web server URL path for the web server module unit;
   providing, by the terminal apparatus, the web server URL path to a multimedia device player for playing the multimedia content encrypted based on DRM;
   when the multimedia device player accesses the web server module unit by using the web server URL path, checking, by the terminal apparatus, whether there is a session being connected to the web server URL; and
   controlling, by the terminal apparatus, whether to decode the multimedia content encrypted based on DRM depending on the checking results,
   wherein said controlling whether to decode includes:
      when there is no session being connected to the web server URL, decoding the multimedia content encrypted based on DRM, and
      when there is a session being connected to the web server URL, performing no decoding on the multimedia content encrypted based on DRM,
   wherein said decoding the multimedia content encrypted based on DRM includes:
      converting reversely, by the terminal apparatus, the web server URL path into a local file path of the multimedia content encrypted based on DRM; and
      reading the multimedia content encrypted based on DRM using the reversely converted local file path,
      wherein when performing the decoding, decoding, by the terminal apparatus, the multimedia content encrypted based on DRM by using a license for the multimedia content encrypted based on DRM; and
   providing, by the terminal apparatus, the decoded multimedia content to the multimedia device player.

2. The method of claim 1, further comprising:
   if there is no session being connected to the web server URL, storing, by the terminal apparatus, session information between the multimedia device player and the web server module unit.

3. A terminal apparatus for playing multimedia content encrypted based on digital rights management (DRM), comprising:
   a local file memory;
   a DRM decoding unit comprising a web server module unit and a resource manager unit converting, upon receipt of a request for playing the multimedia content encrypted based on DRM stored in the local file memory, a local file path via which the multimedia content encrypted based on DRM corresponding to the received play request is stored into a web server URL path for the web server module unit; and a multimedia device player unit accessing the web server module unit by using the web server URL path for playing the multimedia content encrypted based on DRM, wherein when the multimedia device player accesses the web server module unit by using the web server URL path, and the web server module unit checks whether there is a session being connected to the web server URL, wherein the DRM decoding unit further comprises a decoding module unit that decodes the multimedia content encrypted based on DRM when there is no session being connected to the web server URL, and not to decode the multimedia content encrypted based on DRM when there is a session being connected to the web server URL, wherein when the decoding module unit decodes the multimedia content encrypted based on DRM, the web server module unit converts reversely the web server URL path into a local file path of the multimedia content encrypted based on DRM and reads the multimedia content encrypted based on DRM using the reversely converted local file path, wherein, when performing the decoding, the decoding module unit to decodes the multimedia content encrypted based on DRM by using a license for the multimedia content encrypted based on DRM, and provides the decoded multimedia content to the multimedia device player.

4. The terminal apparatus of claim 3, wherein if there is no session being connected to the web server URL, the web server module unit stores session information between the multimedia device player and the web server module unit.

* * * * *